United States Patent [19]

Check, Jr.

[11] 4,310,754

[45] Jan. 12, 1982

[54] COMMUNICATION MEANS WITH TRANSDUCER PHYSICALLY SPACED FROM INTERIOR WALL OF SECURE HOUSING

[75] Inventor: Frank T. Check, Jr., Orange, Conn.

[73] Assignee: Pitney Bowes Inc., Stamford, Conn.

[21] Appl. No.: 63,369

[22] Filed: Aug. 3, 1979

Related U.S. Application Data

[63] Continuation-in-part of Ser. No. 918,785, Jun. 26, 1978, abandoned, which is a continuation of Ser. No. 704,998, Jul. 14, 1976, abandoned.

[51] Int. Cl.[3] .......... G06K 7/10; G02B 5/14; H04Q 1/06; G02B 5/16

[52] U.S. Cl. .......... 235/454; 235/375; 250/227; 350/96.2 A; 364/464; 340/825.57; 455/602; 455/603; 455/612

[58] Field of Search .......... 235/375, 376, 380, 454; 340/347 P, 152; 209/DIG. 1; 350/96 B; 364/464, 466; 250/227

[56] References Cited

U.S. PATENT DOCUMENTS

| | | | |
|---|---|---|---|
| 1,981,999 | 11/1934 | French | 178/44 |
| 3,428,948 | 2/1969 | Simjian | 340/147 |
| 3,501,744 | 3/1970 | Simjian | 340/152 R |
| 3,541,341 | 11/1970 | Leete | 250/227 |
| 3,635,297 | 1/1972 | Salava | 364/466 |
| 3,997,894 | 12/1976 | Levine | 350/96 B |
| 4,024,380 | 5/1977 | Gunn | 209/DIG. 1 |

FOREIGN PATENT DOCUMENTS

| | | |
|---|---|---|
| 1101223 | 1/1968 | United Kingdom . |
| 1148639 | 4/1969 | United Kingdom . |
| 1276220 | 6/1972 | United Kingdom . |
| 1378648 | 12/1974 | United Kingdom . |
| 1429875 | 3/1976 | United Kingdom . |

OTHER PUBLICATIONS

Stigliani, "Light Interface Technology", Conference 1971 IEEE International Electromagnetic Record 7/71, pp. 316–321.

Callahan, "Optical Delay Compressor," IBM Tech. Disc. Bull., vol. 14, No. 8, Dec. 1971, pp. 2208–2209.

IBM Technical Disclosure Bulletin, "Optical Data Coupler," R. C. Clapper, et al., vol. 16, No. 11, Apr., 1974, pp. 3523–3524.

*Primary Examiner*—Robert M. Kilgore

*Attorney, Agent, or Firm*—David E. Pitchenik; Soltow, Jr. William D.; Albert W. Scribner

[57] ABSTRACT

An improved input/output channel for linking a computer control unit for an electronic postal meter to input/output units. The invention include a converter for converting unit-output electrical signals to non-conductive carrier signals and for converting the non-conductive carrier unit-input signals back to electrical signals. Non-conducting means are used to transmit the signals between the meter and the input/output units so that any attempts to interfere with meter operation will, of necessity, involve physical evidence of tampering, observable to an inspector.

18 Claims, 9 Drawing Figures

COMMUNICATION MEANS WITH TRANSDUCER PHYSICALLY SPACED FROM INTERIOR WALL OF SECURE HOUSING

RELATED APPLICATIONS

This case is a continuation-in-part of U.S. application Ser. No. 918,785, filed on June 26, 1978, now abandoned, which in turn was a continuation of U.S. Application Ser. No. 704,998, filed July 14, 1976 and now abandoned.

BACKGROUND OF THE INVENTION

The present invention relates to postal meters and more particularly to an electronic postal meter having an improved, noise-rejection input/output channel.

Electronic postal meters have been developed utilizing microprocessors as a part of the meter control unit. Data and instructions may be entered into the control unit for such meters through keyboard devices. The results of calculations, requests for more information and error messages may be presented to an operator on an output printer or on a CRT display unit. Units such as the keyboard, the printer and the CRT display, generally described as input/output devices may be located at some distance from the meter control unit and the meter mechanism controlled by that unit, requiring some form of communications channel between the input/output devices and the meter control unit. Heretofore, the communications channel consisted of direct electrical connections in the form of electrical cables or leads between the computer control and the input/output devices.

Postal meters are generally located in the vicinity of other electrical machines which, during operation, may produce extraneous electric fields. Such extraneous electric fields may induce noise voltages in nearby electrical apparatus and particularly in cables or leads. Where the apparatus operates with low signal voltages, as is the case for a microprocessor, induced noise voltages may cause the apparatus to misinterpret and erroneously act upon incoming information.

Moreover, postal meters are most likely to be found in business offices. Since many business offices are carpeted, users of postal meters may build up a static electric charge simply in walking to the meter. When the user touches the keyboard or other input unit, the static electrical discharge may temporarily cause a controlling microprocessor to malfunction or to misinterpret incoming data.

Shielded cables have been used to shield electrical connectors from extraneous electric fields. However, such shielded cables do not solve another problem; i.e., the effect of an electrical malfunction or voltage surge generated in an input/output device such as a keyboard. When a malfunction occurs or a voltage surge takes place in such a device, the voltage may be transmitted directly to the microprocessor control. Voltage surges may disrupt microprocessor operation or even destroy microprocessor circuitry.

Moreover, it is possible for a remote postal meter to be disconnected from one input/output device and reconnected to another. Where the meter and the control unit are directly connected, a faulty reconnection may cause damaging voltages to be applied to the meter.

SUMMARY OF THE INVENTION

The present invention is an improved, noise voltage-rejecting input/output channel which also isolates a postal meter control from surge voltages occurring at remotely-located input/output devices while providing improved security.

The invention is employed in a postal meter having a postage printer. The postal meter also includes a control means for generating the printer-setting signals and input/output means for providing information in the form of electrical signals to and for receiving information in the same form from the control means. The control means and the input/output means are linked by an improved input/output channel which includes means for converting electrical signals provided by one of the linked means to optical signals. The channel also includes means for transmitting the optical signals and means for converting the transmitted optical signals to an electrical format usable by the other of the linked means.

In accordance with a further preferred embodiment of the invention, optical electric transducing means are provided with the secure housing of the postal meter at a location that is substantially inaccessible from the exterior of the secure housing, even by way of the port or the like in the housing through which the communication path to peripheral equipment extends. The optical-electric transducing means may be in the form of optical-electric coupling devices of conventional form, if the communication path to the peripheral equipment is by way of electric conductors, or it may be in the form of photo-electric devices positioned to receive radiation from optical fibers, if the optical fibers are employed as a communication path. Independently of the form of the communication path, however, the interior of the secure housing is configured to render it as difficult as possible to apply potentials, either intentionally or accidentally, to the electric circuit portions of the transition means. As a consequence, the accidental or intentional application of voltages which may cause damage to the electronic circuits within the housing, is inhibited, independently of the type of communication path employed, whereby voltages cannot be externally applied to the accompanying circuits or registers of the postal meter so as to damage the equipment or wipe out the data stored therein. The inaccessibility of the transducing means may be due to, for example, the placement of the transducing means as deep as possible within the secure housing, the providing of a circuitous route for the portion of the communication path within the secure housing, or the provision of a connector assembly at the port of the housing through which the communication path extends that inhibits the directing of conductors into the housing that could carry potentials detrimental to the electronic system.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DETAILED DESCRIPTION

Figure 1:
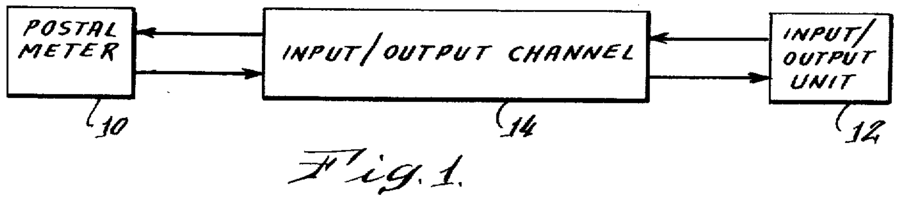
FIG. 1 is a general block diagram of a system which may include the invention.

Referring now to FIG. 1, a postal meter 10 is linked to an input/output unit 12 through an input/output channel 14. Postal meter 10 is an electronic device in which the contents of the ascending and descending registers, among others, are stored electronically. Postal meter 10 accepts data and instructions sent to it through the input/output channel 14 from the input/output unit 12. In turn, postal meter 10 provides signals to the input/output unit 12 through channel 14 representing the results of calculations, requests for further instructions and error messages.

Input/output unit 12 may include a keyboard for entering data and instructions into the system and a printer or CRT display for presenting the results of calculations, instruction requests and error messages to an operator. While unit 12 is represented as a single device, the input and output sections of unit 12 obviously could be physically-independent units. Input/output channel 14, which will be described in more detail later, is highly immune to noise voltages generated outside the system and also acts to prevent the transmission of voltage surges from one of the units to the other.

Figure 2:
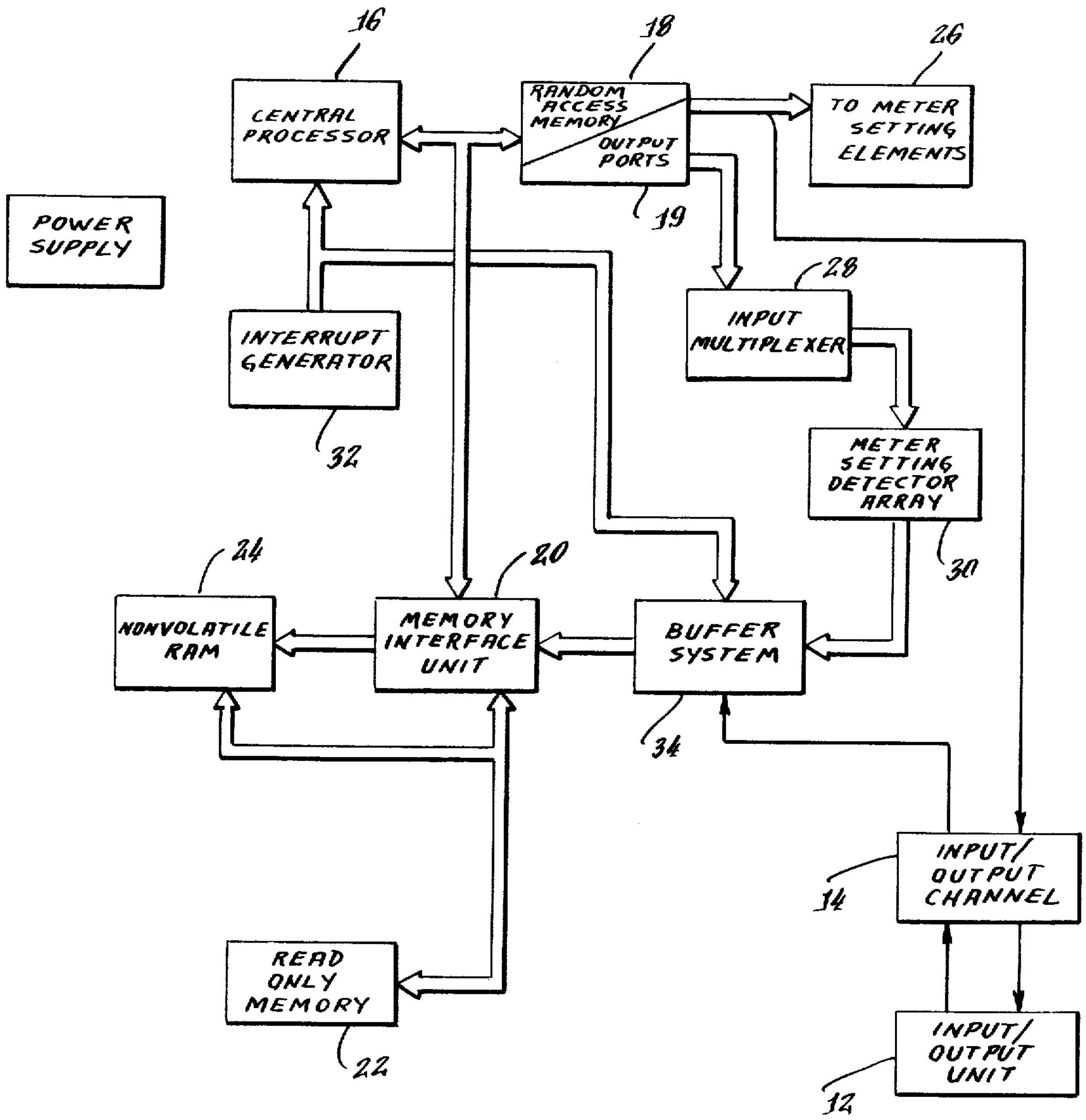
FIG. 2 is a more detailed block diagram of the system.

Referring now to FIG. 2, the entire system is shown in block diagram form. A central processor unit 16 communicates with random access memory 18, output ports 19 and with a memory interface unit 20 which generally controls the flow of data and instruction between central processor unit 16, read-only memory 22 and a special-purpose, non-volatile random access memory 24. In a preferred embodiment of the invention, the components may be commercially-available solid-state chips. Central processor unit 16, random access memory 18 and read-only memory 22 may be one or more 4040, 4002 and 4001 chips, respectively, in a MSC-4 Micro Computer Set available from Intel Corporation of Santa Clara, California.

Output signals from the central processor unit 16 are transmitted through output ports 19, to meter setting elements 26, to an input multiplexer 28 and to the input/output channel 14.

Inputs to the control for postal meter 10 include both internal and external inputs. The external inputs are provided by input/output unit 12 through input/output channel 14 to a buffer system 34. Internal inputs representing the status of components of a meter setting mechanism are provided by a meter setting detector array 30 under the control of multiplexer 28. Multiplexer 28 is preferably in Intel 4003 chip. Selected outputs from detector 30 are applied to buffer system 34. Additional internal inputs are provided by an interrupt generator circuit 32 which applies an interrupt signal to the central processor unit 16. The outputs of interrupt generator circuit 32 are applied to buffer system 34. Outputs from buffer system 34 are applied to the memory interface unit 20.

The central processor unit 16 performs calculations using data provided through the input buffer system 34 and instructions stored in read-only memory 22. Read-only memory 22 serves as a program store for the routines and subroutines employed within the meter 10. Random access memory 18 provides a working memory for the central processor unit 16. Non-volatile random access memory 24 is a special purpose memory for operating on and storing the contents of certain critical registers within the postal meter 10. These registers include the ascending register which contains the accumulated total of all postage processed through the meter 10 and the descending register which stores the amount of funds remaining to be used in the meter 10. Non-volatile memory 24 is powered with a battery back-up unit to permit the contents of memory 24 to be saved in the event of a loss of power in the meter 10. The memory interface chip 20 which controls input/output from non-volatile random access memory 24 may be a 4289 chip available from Intel Corporation while memory 24 may be conventional RAM chip such as a MC 14552 (Motorola).

Figure 3:
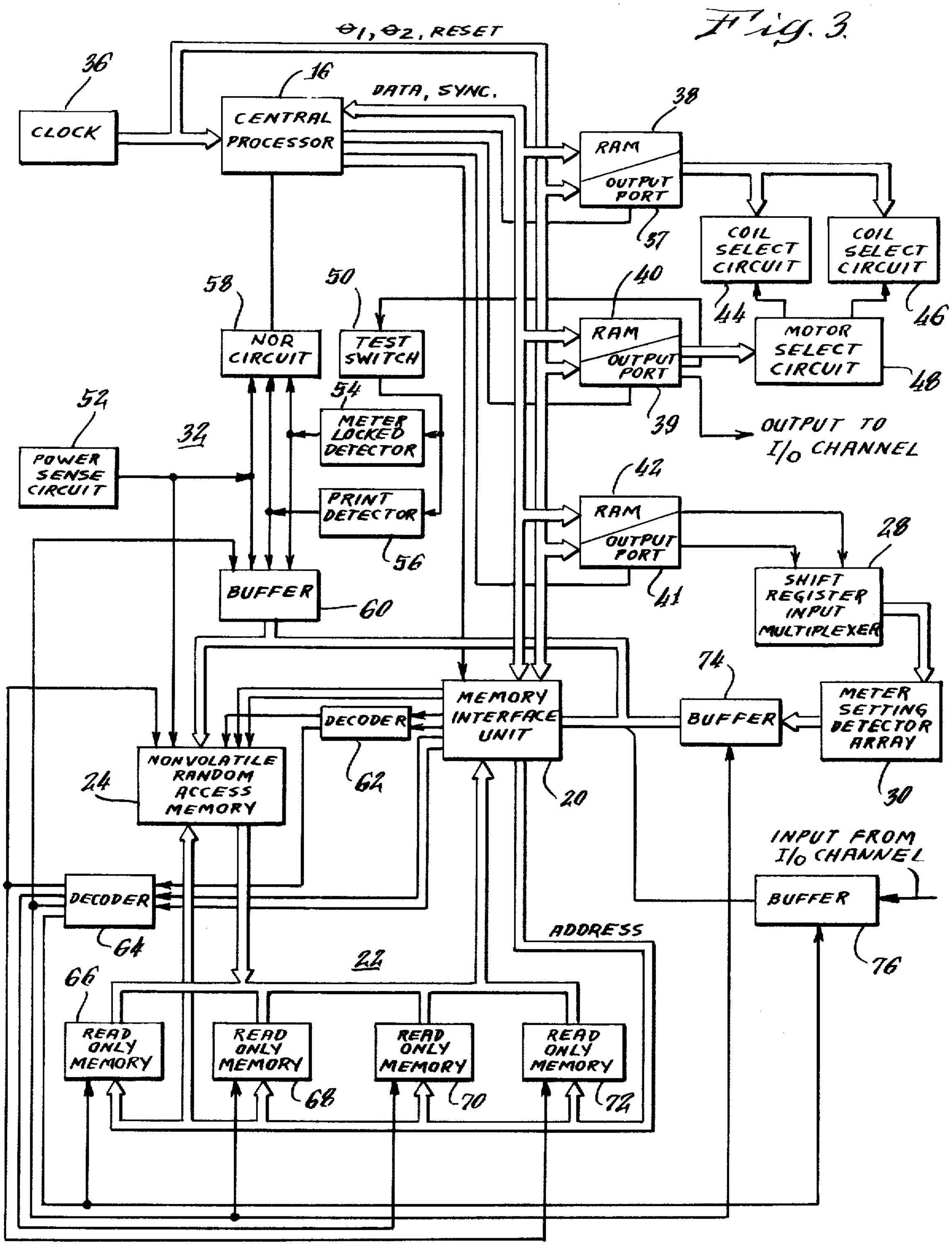
FIG. 3 is a detailed block diagram of the control means for the postal meter.

Further details as to the organization of the postal meter 10 appear in the description relating to FIG. 3. The operations of central processor unit 16 are timed by a clock circuit 36 which supplies two trains of non-overlapping clock pulses 01 and 02 and a reset signal. These signals are applied to the central processor unit 16, to memory interface unit 20 and to a number of random access memory units 38, 40, 42.

Outputs from an output port 37 associated with random access memory unit 38 are applied to a pair of coil select circuits 44, 46 which are used in setting the one type of postal printing device. The coil select circuits 44 and 46 are connected to a motor select circuit 48 which, under the control of outputs from an output port 39 associated with random access memory unit 40, determines which of the two motors will be energized. Details of the coil select circuits 44 and 46 and the motor select circuit 48 are provided in a following section of this specification. Another output from output port 39 controls a test switch 50, which is part of the interrupt generator circuit 32.

The interrupt generator circuit 32 includes a power sense circuit 52, a meter locked detector 54 and a print detector 56. The power sense circuit 52 monitors the output of the power supply for the postal meter and generates an interrupt signal whenever the onset of a power failure is detected. This interrupt signal triggers a computer routine in which the contents of the ascending and descending registers are updated in the non-volatile random access memory 24 before the meter shuts down.

The print detector circuit 56 includes photoelectric devices for sensing the completion of a mechanical printng operation by the meter. This information is used for resetting the computer to enable calculation of new postal values. The meter locked detector 54 includes photoelectric devices which sense whether the meter, itself a relatively small unit, remains attached to its original, relatively large base. If the meter is removed from the base for any reason, an output from meter locked detector 54 causes an interrupt signal to be generated. This interrupt signal is employed to disable the meter. The outputs of power sense circuit 52, meter locked detector circuit 54 and print detector circuit 56 are applied both to a NAND circuit 58 and to a logic buffer 60.

In a preferred embodiment, postal meter 10 employs negative logic; that is, a binary "1" is represented by a negative voltage such as −15 volts whereas a binary "0" is represented by a more positive voltage such as ground or zero volts. When any of the outputs of the circuits 52, 54, 56 goes to a binary 1 level, the output of NOR circuit 58 switches to produce an interrupt pulse at an input to the central processor unit 16. Since the response of the central processor unit 16 will be different for different ones of the interrupt signals, the interrupt signals must be applied as an internal input in the system through the logic buffer 60. Interrupt signals appearing on the output of buffer 60 are applied to memory interface unit 20 which, in response to a command from the central processor unit 16, transfers the interrupt signal to the processor for decoding.

The memory interface unit 20 provides outputs to a first decoder circuit 62 and a second decoder circuit 64. One input to the second decoder circuit 64 is provided by the first decoder circuit 62. The decoder circuit 62 and 64 are used in selecting whether non-volatile random access memory 24, one of several read-only memory units 66, 68, 70, 72 or one of a number of input logic buffers 60, 74, 76 is to be enabled.

A single input to buffer 76 is provided from the input/output channel 14. Outputs to the input/output channel 14 are provided by output port 39 associated with random access memory 40. Logic buffer 74 receives signals from meter setting detector array 30. There are more detectors in the detector array 30 than logic buffer 74 can accommodate at one time. A shift register input multiplexer 28 operating under the control of signals provided through the output port 41 associated with random access memory 42 multiplexes the inputs from detector array 30 to logic buffer 74. Multiplexer 28 may be a 4003 device available from Intel Corporation.

Figure 4:
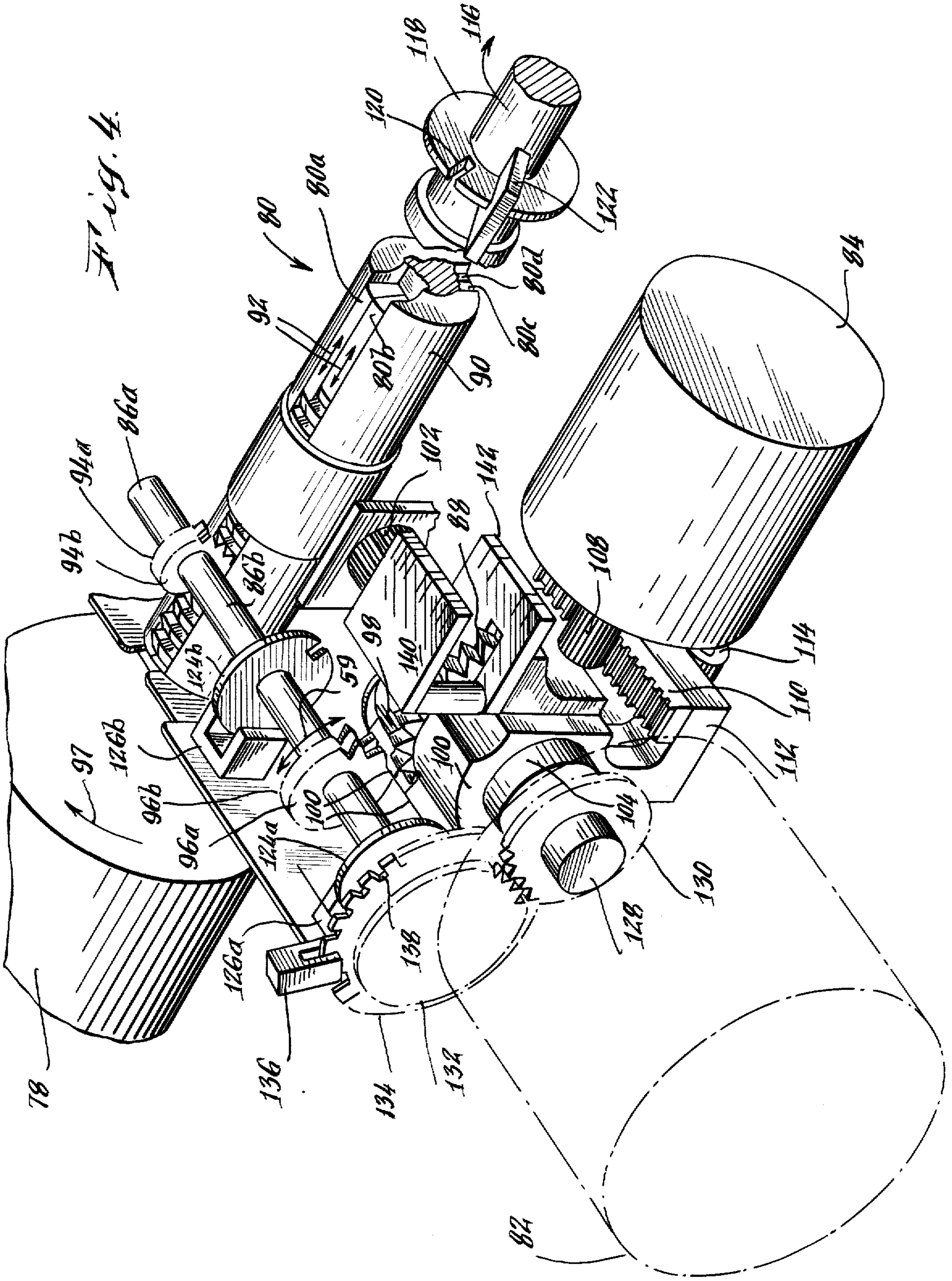
FIG. 4 is a perspective of the postal printing mechanism driven by the control means.

The postal meter described above represents one embodiment of a meter for controlling a postal printing mechanism now to be described with reference to FIG. 4. In a preferred embodiment, the mechanism is used to set print wheels contained within a print drum 78 of a modified Model 5300 postage meter manufactured by Pitney Bowes, Inc., Stamford, Conn. The basic Model 5300 postage meter is a mechanical device with mechanical registers and actuator assemblies. The modified meter contains only the print drum 78 and a set 80 of print wheel driving racks **80*a*, 80*b*, 80*c*, 80*d***. All mechanical registers and actuator assemblies have been removed.

The print wheels (not shown) within print drum 78 are set by a mechanism driven by a first stepping motor 82 and a second stepping motor 84. Signals for controlling the operation of the stepping motors 82 and 84 are provided through the output ports 37 and 39 of the control system. Further details of the connections between the output ports 37 and 39 and the coils for the stepping motors 82 and 84 are provided later in the specification.

The stepping motor 82 drives the set 80 of postal wheel driving racks through a gearing assembly including upper and lower nested shafts. Only the upper set of nested shafts of **86*a*, 86*b* is shown. The angular settings of the nested shafts are controlled by a master gear 88 which may be driven in either a clockwise or counterclockwise direction by the stepping motor 82**.

The print drum 78 has four independently-positioned print wheels (not shown) which provide a postage impression to the maximum sum of $99.99. Each print wheel provides a separate digital sum and can be set from "0" to "9". The print wheels are sequentially set by the meter setting mechanism by means of the four driving racks **80*a*, 80*b*, 80*c*, 80*d* which are slidable within a print drum shaft 90 in the directions indicated by the double-headed arrows 92**.

The settings of the upper racks **80*a*, 80*b* are controlled by pinion gears 94*a*, and 94*b*, respectively. The settings of the lower racks 80*c* and 80*d*** are controlled by a similar set of pinion gears, not shown in the drawings.

The pinion gear **94*a* is connected to the inner shaft 86*a* while the pinion gear 94*b* is connected to the concentric outer shaft 86*b*. The pinion gears which control the settings of driving racks 80*c*, 80*d* are similarly attached to the lower set of nested shafts, not shown. The angular positions of the nested shafts are controlled by shaft-mounted spur gears, of which only the upper spur gears 96*a*, 96*b*** are shown.

The master gear 88 can be shifted laterally along an axis parallel to the axis of the spur gears, including gears **96*a* and 96*b*, to intermesh with a single gear at a time. The master gear 88 is rotatably mounted within a slot 98 in a yoke 100 which slides along a splined shaft 102. The yoke 100 is held away from rotatable engagement with splined shaft 102 by an interposed sleeve bushing 104. The yoke 100 includes a pair of upper and lower tooth troughs located on the upper and lower surfaces of the yoke 100. Only the upper tooth trough 106 appears in the drawing. As the yoke 100 and master gear 88 slide laterally along the splined shaft 102, the upper and lower laterally-extending tooth troughs entrap a tooth of each of the spur gears. The tooth troughs prevent rotational movement of any of the spur gears other than the spur gear meshed with the master gear 88**.

The lateral position of yoke 100 is controlled by a stepping motor 84, the output shaft of which carries a splined gear 108. The splined gear 108 meshes with a rack 110 attached to yoke 100 at an L-shaped lower extension 112. The rotation of splined gear 108 upon energization of stepping motor 84 is translated into lateral movement of yoke 100 through the rack 110 and pinion or splined gear 108. The splined gear 108 also serves to prevent counter-clockwise rotation of yoke 100 about the axis of shaft 128 of stepping motor 82 during energization of that motor which might otherwise occur due to friction between rotating sleeve bushing 104 and the yoke 100. A roller 114 mounted beneath the L-shaped extension 112 prevents any clockwise movement of the yoke 100 about the axis of shaft 128.

When the print wheels within print drum 78 have been set to the correct postage value position, drum 78 is rotated by shaft 90 in a direction indicated by arrow 116 to imprint the postage. The drum 78 is then returned to a home or rest position sensed by a slotted disk 118 mounted on shaft 90. When a slot 120 in disk 118 is interposed between the arms of an optical detector 122, the shaft 90 is at its home position.

All optical detectors in the setting mechanism are basically U-shaped structures having a light emitting diode located in one arm and a phototransistor located in the other arm. Light emanating from the light emitting diode is transmitted to the phototransistor only when a slot in an interposed disc is aligned with the arms of the detector.

The home or "0" positions of nested shafts 86*a* and 86*b* are similarly sensed by slotted discs 124*a* and 124*b*, respectively, in combination with optical detectors 126*a* and 126*b*. The home or "0" positions of the lower pair of nested shafts are sensed by similar slotted discs and optical detectors, none of which are shown in the drawing.

The shafts and gears are returned to the home position upon startup of the meter. Subsequent setting is accomplished by stepping the motor 82 through a calculated number of steps using previously-established settings as a reference.

The angular movement of the stepping motor shaft 128 (and consequently splined shaft 102 and master gear 88), is monitored by means of an assembly of gears 130 and 132, slotted monitoring wheel 134 and optical detector 136. Gear 130 is rigidly mounted on and rotates with the stepping motor shaft 128. Gear 130 meshes with gear 132 which is attached to and rotates with the slotted monitoring wheel 134. Gears 130 and 132 are of the same diameter and cause slotted monitoring wheel to rotate through the same angles of rotation as stepping motor shaft 128. Each slot on slotted monitoring wheel 134 corresponds to a change of one unit of postage value. Every fifth slot 138 on monitoring wheel 134 is extra long to provide a check on the monitoring operation. Optical detector 136 has two photosensors. One of the photosensors is mounted deeply within the detector; that is, near the periphery of slotted monitoring wheel 134. The other sensor is located nearer the center of the slotted monitoring wheel 134. The latter photosensor receives light from an associated light source on the opposite side of the slotted monitoring wheel 134 only when the extra long slot 138 is aligned within the detector. Thus, this photosensor provides an output every fifth step of the monitoring wheel 134.

The output signals produced by the other photosensor are counted in the control system. If a count of five is not detected when the extra long slot 138 is aligned within detector 136, an error condition exists. Similarly, if the extra long slot 138 is not detected when a count of 5 has been accumulated, an error condition exists.

The lateral position of yoke 100 and master gear 88 is monitored by a position indicator including a pair of spaced plates 140 and 142 attached directly to yoke 100. The plates 140 and 142 include slot patterns which are a binary-encoded representations of different positions of the yoke relative to optical detectors (not shown) which would be attached to a bracket on stepping motor 84.

Preferably, plates 140 and 142 have five or more binary slot patterns identifying an equal number of lateral positions of the yoke 100. Each of the slot patterns consists of a unique triplet in which the presence of the slot in one of the plates 140, 142 is interpreted as a binary 1 while the absence of a slot in any position where a slot might appear is interpreted as a binary 0. The binary indicia for the two outside positions in each triplet are included in plate 140. The binary indicia for the center position in each triplet is included in plate 142.

The binary indicia are distributed between two vertically-aligned plates in one embodiment of the invention only because available optical detectors are too bulky to permit three detectors to be placed side-by-side on the single plate of reasonable size. From a logic standpoint, there would be no significance to the fact the indicia are distributed between two plates. The indicia would be read and interpreted as if they were contained on a single plate.

The binary signals produced by the optical detectors associated with plates 140 and 142 are internal inputs to the postal meter 10. These signals, along with other signals, are part of the meter setting detector array 30 shown in block diagram form in FIG. 3.

Figure 5:
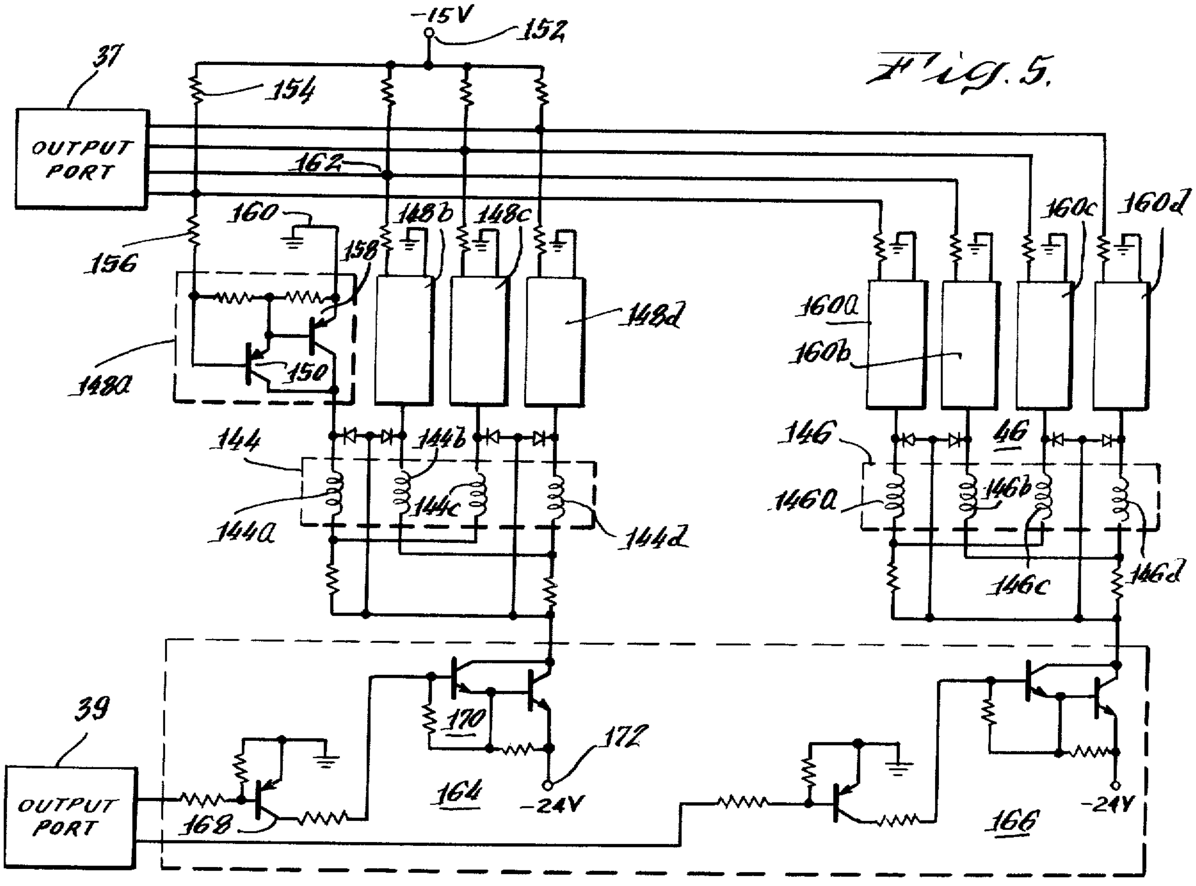
FIG. 5 is a detailed schematic diagram of the interface between the control means and the postal printing mechanism.

The electrical interconnections of the stepping motors 82 and 84 with the output ports 37 and 39 are described with reference to FIG. 5. The four parallel output leads from output/port 37 are connected to the coil select circuits 44 and 46 for the stepping motors 82 and 84, respectively. Each of the stepping motors is a conventional eight-phase stepping motor, which is rotated in predetermined angular increments by energizing different combinations of four coils contained within the motor.

The coils for stepping motor 82, included within a coil system 144, are identified as coils 144*a*, 144*b*, 144*c* and 144*d*. Similarly, the coil system 146 for motor 84 includes coils 146*a*, 146*b*, 146*c*, 146*d*. Each of the individual coils in each motor is connected in series with a Darlington amplifier. For example, coil 144*a*, is connected in series with Darlington amplifier 148*a* in which the base terminal of a first transistor 150 is connected to output port 37. A second transistor 158 has a grounded emitter, a base terminal connection to the emitter of transistor 150 and a collector connected to the collector of transistor 150. Darlington amplifier 148 is off or nonconducting when the associated output 162 from output port 37 is at a binary 0 or ground potential. In this state, the Darlington amplifier prevents current flow from an associated ground terminal 160 through the second transistor 158 and thus through coil 144*a*. When the output 161 drops to a more negative or binary 1 level, the Darlington amplifier 148*a* is switched to an on or conducting state.

Darlington amplifiers 148*b*, 148*c*, and 148*d* are identical to amplifier 148*a* except for the connections to different output leads and different motor coils.

The coils in coil system 146 are similarly connected in series with Darlington amplifiers 160*a*, 160*b*, 160*c*, 160*d*. Corresponding coils in each of the coil systems 144 and 146 are connected to the same output terminal of output port 37. For example, coils 144*b* and 146*b* are connected through respective Darlington amplifiers 148*b* and 160*b* to output 162. A binary 1 signal on output 162 switches both Darlington amplifiers 148 and 160*b* into their on or conducting state. However, coil current will be established in only the motor selected by operation of motor select circuit 48.

Motor select circuit 48 is connected to outputs from output port 39 and comprises switching circuits 164 and 166 connected in series with coil systems 144 and 146, respectively.

Switching circuit 164 includes an inverter amplifier 168 which provides an increased current at its collector terminal when the input to the amplifier 166 falls to the more-negative binary 1 level. The output of inverter amplifier 168 is applied to a Darlington amplifier 170 which, when conducting, provides a current path from a ground for each of the coils in coil system 144 to a −24 volt source 172.

Figure 6:
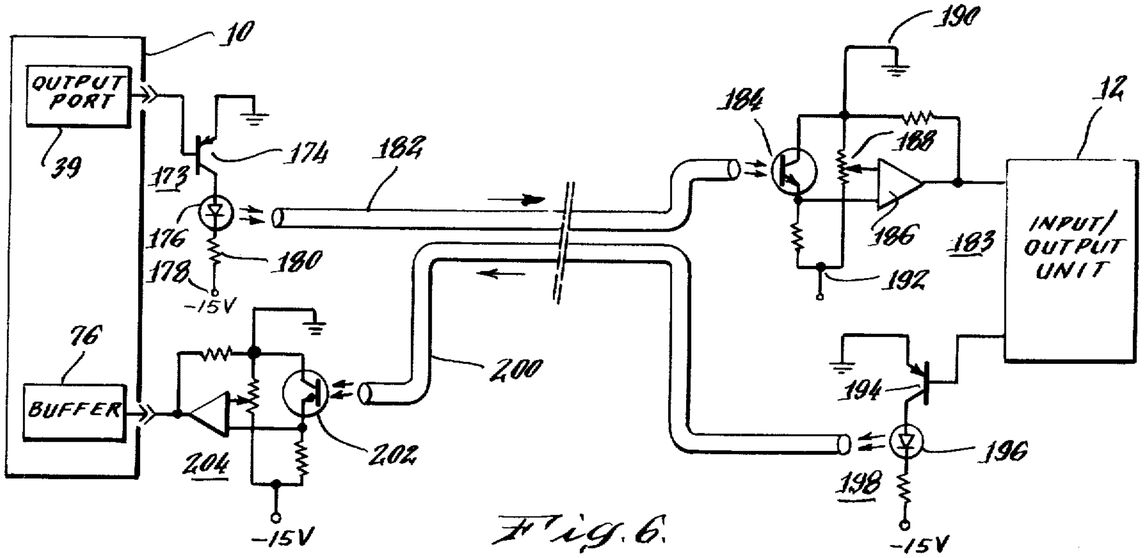
FIG. 6 is a schematic diagram of a preferred embodiment of the improved noise-rejecting input/output channel.

The preferred embodiment of the improved input/output channel which links postal meter 10 and input/output unit 12 is described in detail with reference to FIG. 6. To simplify the drawing, postal meter 10 is shown as including only output port 39 and input buffer 76. Binary signals to be transmitted to the output section of output unit 12 from postal meter 10 are applied in serial fashion to an electrical-to-optical transducer 173. The signals are applied at the base terminal of a transistor 174 having a grounded emitter and a collector connected to the anode of a light-emitting diode 176. The cathode of diode 176 is connected to a −15 volt source 178 through a current-limiting resistor 180.

The light-emitting diode 176 is adjacent one end of a first light-transmitting fiber 182, the opposite end of which is adjacent a phototransistor 184 in a first optical-to-electrical transducer circuit 183.

The emitter of phototransistor 184 is connected to one input of a comparator amplifier 186, the second input to which is provided through a voltage divider 188 connecting a ground terminal to a −15 volt source 192. The input to the comparator amplifier 186 provided through the voltage divider 188 establishes a threshhold voltage which the output of phototransistor 184 must exceed before the transistor output will be read as a binary 1 signal. The threshold voltage reduces the chance that noise voltages generated within postal meter 10 or either of the transducers 173 or 183 will be interpreted as binary 1 signal voltages. Binary signals representing data or instructions to be input to the postal meter 10 from the input section of unit 12 are applied to a second electrical-to-optical transducer circuit 198. The signals are applied at the base terminal of a transistor 194 in circuit with a light-emitting diode 196 adjacent one end of a second light transmitting fiber 200. The opposite end of fiber 200 is adjacent a phototransistor 202 in a second optical-to-electrical transducer 204. Transducer 204, which is identical in construction to transducer 183, converts the optical signals to electrical signals which are applied to one input of buffer circuit 76 of postal meter 10.

Since the input/output information transmitted through the channel 14 is transmitted in the form of optical signals and since extraneous electric fields cannot induce noise voltages in such optical fibers, the channel 14 effectively resists induction of such noise voltages. Of course, light-transmitting fibers 182 and 200 must be coated or otherwise shielded from extraneous light.

Moreover, because the maximum output of the light emitting diodes is limited, the occurrence of a voltage surge or a static electrical discharge at the input/output unit cannot be transmitted at destructive levels to the postal meter 10. Even a direct short circuit across one of the electrical-to-optical transducers will not be destructive, since the output of the optical-to-electrical transducer is also inherently limited regardless of the intensity of the optical input.

Figure 7:
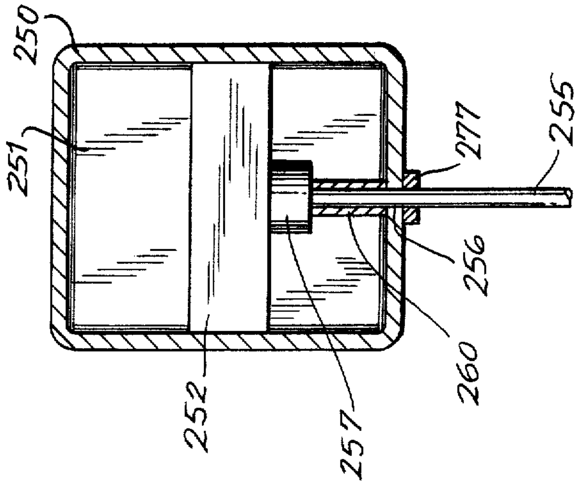
FIG. 7 is a simplified schematic illustration of a postal meter in accordance with a further embodiment of the invention.

FIG. 7 shows, in simplified form, one form of the preferred embodiment of the invention. In this arrangement, a secure housing 250 for a postal meter encloses a printing device 251, of conventional type, such as the modified model 5300 postage meter of Pitney Bowes, Inc., as disclosed in U.S. Pat. No. 4,050,374. In addition, the secure housing encloses an electronic accounting system 252 of the type above described, for example, with reference to FIGS. 2 and 3. The printing device discussed with reference to FIG. 4 is particularly adaptable in a postal meter of this type.

Such a postal meter is generally self-contained, in the sense that all of the critical functional elements of the accounting system are provided within the secure housing. The term "critical" is employed herein in the sense that such elements are necessary to maintain a complete and accurate record of any postage that has been printed, as well as a programmed system for ensuring the accurate printing of such postage in accordance with a determined program. It is therefore evident that these elements are provided within the secure housing 250, in order to insure that they are not tampered with, and that the registers provided therein thereby accurately and dependably record the printed postage and are substantially not subject to external influence.

On occasion, it is desirable to provide a postal meter of the above type as part of a larger system, such as, for example, an office system wherein a control panel and various displays may be positioned remotely of the postal meter itself. Such systems thereby require a communication path, such as the path 255, thereby enabling the communication between the postal meter and the input/output peripherals. The peripheral devices may of course constitute the only source of signals corresponding to the postage that is desired to be printed, i.e., the postal meter itself may not necessarily originate such signals since such information is not critical.

The communication path in accordance with the invention is preferably, although not necessarily, a fiber-optic cable, so that the signals may be carried in the form of pulses of light. These signals, in accordance with the invention, are directed, preferably serially, through a port 256 in the postal meter to interface with a transducer 257. While this system is essentially shown with respect to FIG. 3, and, in a proper system, photo transistors of the type illustrated in FIG. 6 may be employed, it is particularly to be noted that the transducers 257 are disposed at some distance within the secure housing. In the event that the communication path comprises a fiber-optic cable, the transducer may be in the form of photo-electric detection means, whereas if the communication path is in the form of an electric signal conveying cable, the transducer means 257 may be in the form of an optical-electric coupler. In other words, in accordance with the invention, it is apparent that the conversion of light signals to electric signals occurs within the secure housing, independently of the form of communication path employed. As a result, the application of high voltages by any means to the communication path will not result in the application of high voltage to the electronic system of the postal meter, unless, of course, such high voltages were applied in such a manner that damage due to their application is readily visible or detectable. Thereby, it is not possible to tamper with the postal meter of the invention by this technique, such that the tampering is undetectable or results in a wiping out of the memories of the electronic system.

In other words, in accordance with the invention, the transducer electrically isolates the electronic accounting system from receiving externally derived potentials that may erase the memories therein or otherwise damage the accounting system. Therefore, any such erasing of the memories or the like must be accompanied by physical evidence of the tampering. The positioning of the transducer is thus, broadly stated, not primarily to inhibit damage to the transducer, but to prevent defeat of the accounting system as a result of undetectable tampering. While it is preferred that opto-electronic coupling be employed for this purpose, it is, of course, apparent that other techniques may alternatively be employed. Thus, acoustic-electric, or saturable magnetic-electric coupling, may similarly be employed with the communication path being adapted thereto.

It is, of course, generally preferred that the communications path be removable from the postage meter, and for this purpose the entry of the communication path 255 to the port 256 may be by way of the releasable coupling or clamp 277. It will be noted in FIG. 7 that the communication path extends for some distance from the clamp into the interior of the housing 250, this path extending, for example, through a conduit 260 or the like in the postal meter. Thereby, upon removal of the communication path, the transducer means 257 may be exposed by way of the port. In accordance with the invention, however, the conduit 260 is sufficiently long and has a sufficiently small diameter that effective entry of a damaging probe into the secure housing is inhibited. In any case, only the transducer might be damaged by the probe. Such damages would be physical and thus detectable. Destruction of the transducer would destroy the communication path but not the internal electronics, thereby allowing a post office or factory inspection to become aware of the damage upon opening up the meter. Any efforts to defeat the system by the application of voltages within the port would therefore be readily detectable to the postal authorities.

It will, of course, be appreciated that the showing of FIG. 7 is schematic only, and the actual extension of the communication path into the secure housing 250 may be significantly greater.

Figure 8:
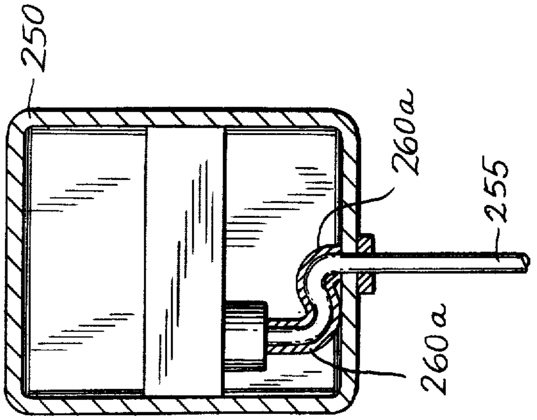
FIG. 8 is a simplified cross sectional view of a modification of the postal meter of FIG. 7.

In the alternative arrangement of FIG. 8, instead of providing a straight conduit 260, a convoluted conduit 260*a* is employed in order to inhibit external access to the transducer means 257. The conduit 260*a* may be curved so as to permit the bending therein of flexible communication path members, while inhibiting passage of any rigid elements that may be inserted into the port for the purpose of tampering.

It is again noted that the effect of tampering will be physically evident. Attempts to destroy the memory, as by high current or voltage sures will be ineffective as a result of the non-conductive path. In the case of an optical transducer, electrical surges will only overload the transducer element coupled to the electrical input portion. If the optical portion is accessed, and an optical overload introduced, only the receiving transducer will overload. In either event, no damage to the memory will occur.

Figure 9:
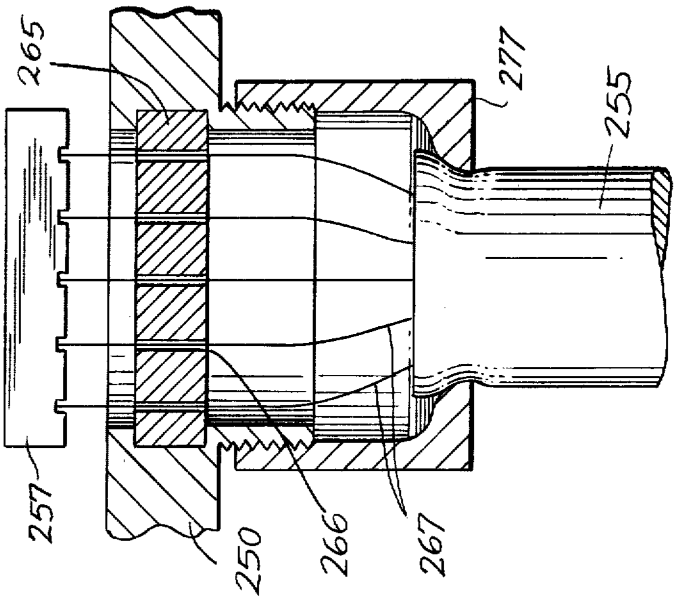
FIG. 9 is an enlarged cross sectional view of a further modification of the arrangement of FIG. 7.

In a still further embodiment of the invention, as illustrated in the enlarged cross section of FIG. 9, an insert such as a disc 265 may be provided permanently fixed in the wall 250 of the secure housing, the disc 265 having one or more small diameter holes 266 extending therethrough. The holes 266 are aligned with active areas of the transducer means 257 and the individual fine fibers 267 of the communication path 255 extend through separate holes 262 in the disc to engage the transducer means 257. A cable clamp 277 holds the fibers of the path 255 in their relative position. The transducer means 257 is preferably spaced from the disc 265, and the holes 266 have small diameters, such as, for example, 0.002", such that the application of damaging potentials to the transducer means 257 by way of these holes is practically impossible. While the communication path 255 is, in this case, preferably a fiber optic cable, it will be appreciated also that it may be comprised of one or more relatively fine conductors, as in the arrangement of FIG. 7.

In the arrangement of FIG. 9, the disc 265 is preferably of a material that is no less easy to penetrate than the wall of the housing 250, and the disc 265 may be held in position by any conventional means so as to not be removable exterially of the housing.

While there has been described what is considered to be a preferred embodiment of the invention, variations and modifications therein will occur to those skilled in the art once they become familiar with the basic concepts of the invention. Therefore, it is intended that the appended claims shall be construed to include all such variations and modifications as fall within the true spirit and scope of the invention.

What is claimed is:

1. A postal meter system comprising a physically secure housing, an interconnected postal printing means and electronic postal accounting system physically enclosed by said housing to secure said printing means and said accounting system from external electrical signals, a peripheral control device disposed remotely from said housing, I/O communication means extending from said peripheral device through a physically secure wall of said housing for interconnecting said accounting system with said peripheral device, comprising said communication means extending into said housing completely through and beyond said wall whereby the internal end thereof is wholly within said housing, and an optical-electric transducer responsive to said communication means and positioned wholly within said housing and physically spaced from the internal wall of said housing at said internal end, said transducer converting optical signals derived from said communication means to electrical signals for application to said accounting system.

2. The postal meter of claim 1, wherein said communication means comprises a fiber optic path and said transducer comprises photo-electric means.

3. The postal meter of claim 1, wherein said communication means comprises an electrically conductive path and said transducer comprises an optical-electric coupler.

4. A postal meter system comprising a physically secure housing, an interconnected postal printing means and an electrical postal accounting system physically enclosed by said housing to secure said printing means and said accounting system from external electrical signals, a peripheral control device disposed remotely from said housing, I/O communication means extending from said peripheral device through a physically secure wall of said housing for interconnecting said accounting system with said peripheral device, an optical-electrical transducer means within said housing and physically spaced from the interior wall of said housing to inhibit access thereto from the exterior of said housing, said communication means including a cable extending through a port in the wall of said housing and terminating at said transducer.

5. The postal meter of claim 4, wherein said transducer is positioned within said housing a distance that is large in comparison with the dimensions of said postal meter.

6. The postal meter of claim 4, wherein said communication means extends in a non-straight direction from said port to said transducer.

7. The postal meter of claim 4, wherein said communication means is comprised of signal elements of small diameter, said port comprising a plurality of small apertures through which said elements pass, said transducer being positioned within said housing in substantial alignment with said apertures, whereby said elements terminate at said transducer.

8. The postal meter of claim 4, wherein said communication means is a fiber-optic cable, said transducer comprising photo-electric means.

9. The postal meter of claim 4, wherein said communication means comprises electrically-conductive wires, said transducer comprising opto-electrical coupling means.

10. The postal meter of claim 4, wherein said electric accounting system comprises electronic registers coupled to said transducer means.

11. A postal meter comprising a physically secure housing, an interconnected postal printing means and electronic postal accounting system physically enclosed by said housing to secure said printing means and said accounting system from external electrical signals, a peripheral control device disposed remotely from said housing, I/O communication means extending through a physically secure wall of said housing for interconnecting said accounting system with said peripheral device, transducer means provided within said housing and physically spaced from the internal wall of said housing, said communication means terminating at said transducer means, said transducer means electrically isolating said communication means from said accounting system, whereby the application of external electrical signals detrimental to said accounting system without physically apparent damage is prevented.

12. The postal meter of claim 1, wherein said communication means extends through said wall by way of a port, and said transducer is positioned within said housing at a location to be substantially inaccessible to the exterior of said housing by way of said port.

13. The postal meter of claim 12, wherein said transducer is spaced from said port a distance large in comparison with the dimensions of said postal meter, and in line with said port.

14. The postal meter of claim 12, wherein said transducer is positioned within said housing out of line with said port.

15. The postal meter of claim 1, wherein said path extends through said wall by way of a port, said port having a plurality of small apertures through which said communication path extends.

16. The postal meter of claim 15, wherein said apertures have diameters of the order of 0.002 inches.

17. The postal meter of claim 1, wherein said transducer is an acoustic-electric transducer.

18. The postal meter of claim 1, wherein said transducer is a saturable magnetic electric coupling.

* * * * *